Oct. 23, 1962  B. E. ASH  3,059,869
TENSION CONTROL MECHANISM FOR WINDING MACHINES
Filed Sept. 23, 1960  2 Sheets-Sheet 1
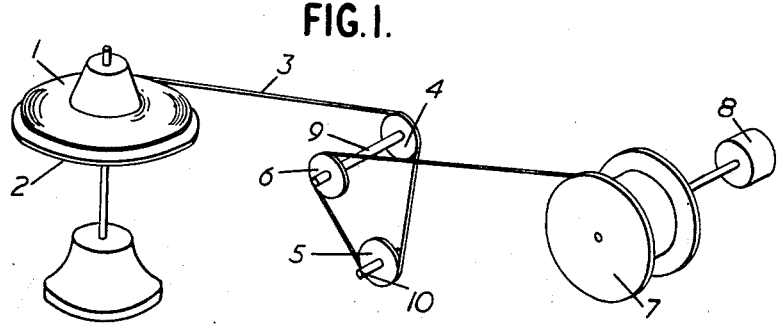
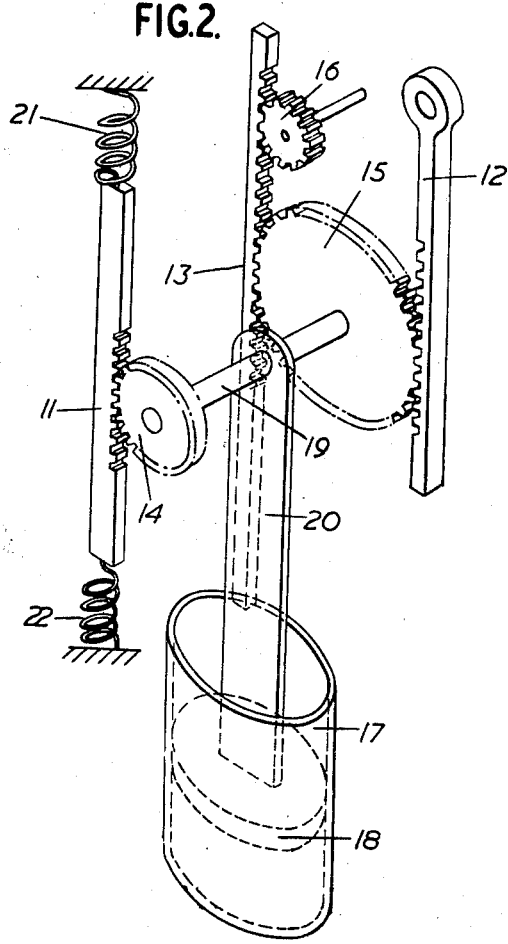
Inventor
B.E. ASH

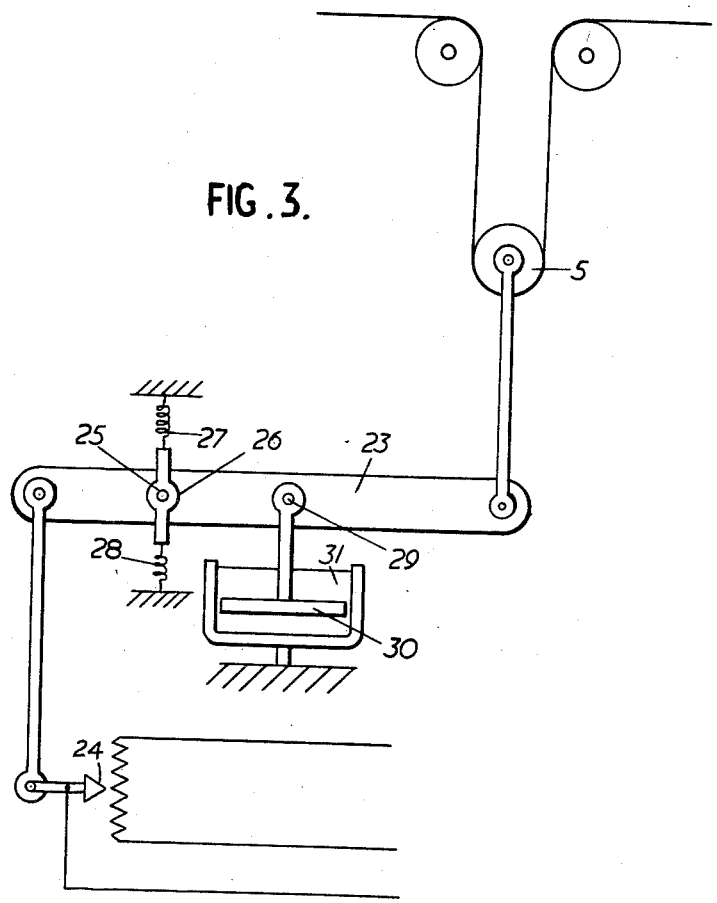

3,059,869
TENSION CONTROL MECHANISM FOR
WINDING MACHINES
Bernard Edwin Ash, London, England, assignor to International Standard Electric Corporation, New York, N.Y.
Filed Sept. 23, 1960, Ser. No. 58,092
Claims priority, application Great Britain Oct. 6, 1959
2 Claims. (Cl. 242—45)

This invention relates to winding machines and in particular to automatic drive stabilisers for use with rewinding and similar machines.

In wire and cable manufacture winding machines are used to wind wire on to reels. For convenience of operation these machines are provided with automatic devices to maintain the wire tension within specified limits by controlling suitable driving and/or braking devices. When the winding process is to be carried out at speed and when the inertia of the moving parts, including the coil of wire, is high, instability, known as hunting, is liable to occur in some types of servo-mechanisms.

In the present invention servo-mechanical control is applied to wire winding and similar machinery and in particular to controls actuated by proportional and derivative (also known as velocity) error signals for the purpose of reducing hunting and improve stability of operation. Peak power requirement of the driving motor is reduced by anticipating the speed setting required to give correct operation.

A general layout of a wire rewinding arrangement and two embodiments of the inventoin will now be described with reference to the accompanying drawings in which:

FIG. 1 is a diagrammatic representation of the layout of a wire rewinding arrangement.

FIG. 2 is a diagrammatic representation of a preferred arrangement of a drive stabiliser according to the invention.

FIG. 3 is a diagrammatic representation of an alternative design of drive stabiliser according to the invention.

In FIG. 1 a coil of wire 1 is shown in position on the swift 2, the wire 3 being taken over pulleys 4, 5 and 6 to the take-up reel 7 driven by the motor 8. Pulleys 4 and 6 are fixed in space, but shaft 10 which carries the pulley 5 is free to move up or down depending on the tension of the wire. This arrangement of pulleys is known as the accumulator.

In conventional automatic drive control equipment, the position of the pulley 5 controls the speed of the take-up motor. This method of control can become unstable, for instance, if the power of the motor is insufficient to balance the inertia forces which occur when large masses are accelerated or decelerated.

According to the invention, the motor 8 of the rewinder and, if required, an additional motor or braking device acting upon the swift 2, not shown, are controlled by the position of the pulley 5 of the accumulator and also by the velocity with which the pulley moves up or down.

The construction and method of operation of the drive stabiliser will be described with reference to FIG. 3 of the drawings.

One end of the lever 23 is connected to the pulley 5 of the accumulator and is moved by it up or down. The opposite end of the lever 23 is connected by means of suitable linkage to the motor controller 24. The lever 23 is pivoted at 25. The bearings 26 of the pivot are free to move up or down but are constrained in a central position by the springs 27 and 28. If the pulley 5 moves up or down slowly, the lever 23 will pivot on 25 and will move the controller 24. This movement of the controller constitutes the ordinary, so called proportional control, since it is proportional to the position of the pulley 5.

Additional control of the take-up motor, dependent on the velocity with which the pulley 5 is moving is obtained by providing lever 23 with a second pivot 29 which is supported in a bearing attached to the plunger 30 of the dash-pot 31. In common with other known devices which could also be used, the plunger of a dash-pot resists motion by a force which is a function of the velocity of the movement. As a result of this resistance to motion, the lever 23 will tend to pivot on 29, thus displacing the bearing 26 until the forces in the springs 27 and 28 balance the forces of the dash-pot and that with which the pulley 5 drives the lever 23. Due to the displacement of the pivot 25 the controller 24 is moved by an amount which is in addition to the positional control previously described. This additional control persists only when the pulley 5 of the accumulator moves and is proportional to the velocity of its vertical movement.

The effect of this arrangement is to apply a large speed correct immediately a velocity error takes place. This speed correction is slowly removed as the velocity error is corrected and the bearing 26 returns to its central position. As the result of the altered position of the pulley 5 the proportional control remains until the motor has equalised the amount of wire in the accumulator and pulley 5 returns to its normal position.

A preferred arrangement of the drive stabiliser is shown in FIG. 2. Two gears 14 and 15 are rigidly coupled by means of the axle 19 and are positioned between the racks 11, 12 and 13. Rack 12 is connected to the moving pulley 5 shown in FIG. 1 and is moved up or down by it. This rack engages the gear 15. Rack 11 is able to slide vertically, but is constrained in a central position by the springs 21 and 22. Rack 13 acts as a link between the gear 15 and the gear 16 attached to the controller, not shown. The axle 19 is connected to the plunger 18 of the dash-pot 17 by means of the link 20.

The similarity between this arrangement and that of FIG. 3 is apparent if one considers that the diameter of the gear 15 in FIG. 2 connecting the points of tangency of racks 12 and 13 is equivalent to the lever 23 of FIG. 3. Racks 13 and 12 are equivalent to the links connecting the pulley 5 and the controller 24 to the lever 23, and finally the point of tangency between gear 14 and rack 11 is equivalent to the pivot 25.

The method of operation of the arrangement shown in FIG. 2 is identical to that of FIG. 3. Assuming that the link 20 is fixed and cannot move axially, then it will be seen that when the rack 12, attached to the pulley 5, moves downwardly or upwardly, as the loop of wire increases or decreases, the rack 13, coupled to the control device 24, will have a corresponding movement in the opposite direction. Since the racks are on opposite sides of the gear 15, the ratio of movement between the racks 12 and 13 will be 1. At the same time, of course, the springs 21 and 22 will permit the rack 11 to move.

Now assuming that the rack 11 is fixed and the link 20 is free to move, then it will be seen that when the rack 12 moves in either direction, the gear 14 will roll along the rack 11. Since the circumference of gear 15 is greater than that of gear 14, the rack 13 will also move in the opposite direction from the movement of the rack 12, but the movement will be considerably less because the link 20 and shaft 19 are moving. Therefore the ratio of movement between the rack 13 and the rack 12 will be considerably less than 1.

Normally the ratio of movement between the rack 13 and the rack 12 will vary between these two limits. Sudden movements of the rack 12 will cause this ratio of movement to approach 1 because the plunger 18 cannot move fast in the dash-pot 17. However very slow movement of the rack 12 will permit the plunger 18 to move in the dash-pot and the ratio of the movements of the two racks will approach the lower figure.

It is to be understood that the foregoing description of specific examples of this invention is not to be considered as a limitation of its scope.

What I claim is:

1. An automatic drive stabilizer for winding machines comprising a pulley rotatably mounted on a shaft, both said pulley and shaft adapted to be supported by a tension loop of the material being wound with the loop passing under the pulley, adjustable means for producing a variable signal for controlling the tension of said loop, linkage means connecting said pulley shaft with said adjustable means, said linkage means comprising motion transmitting means responsive to movement of said pulley shaft in a direction caused by increase or decrease of the length of said loop for producing a proportional corresponding adjustment of said adjustable means to vary the signal so as respectively to increase or decrease the loop tension, and means responsive to the velocity of said movement of said pulley shaft for altering said motion transmitting means so as to change the ratio between the movements of said pulley shaft and said adjustable means to produce a greater movement of said adjustable means with respect to movement of said pulley shaft when the velocity of said pulley shaft movement increases.

2. An automatic drive stabilizer, as defined in claim 1, in which the motion transmitting means comprises a lever, means for linking the pulley shaft to one end of said lever, means for linking the adjustable means to the other end of said lever, and a resiliently supported pivot for said lever located between said ends, and the means for altering the motion transmitting means comprises a dashpot, and means for pivotally connecting said dashpot between a fixed point and a point on said lever between said pivot and said end of said lever to which said pulley shaft linking means is connected.

References Cited in the file of this patent

UNITED STATES PATENTS

| | | |
|---|---|---|
| 2,844,773 | Turner et al. | July 22, 1958 |

FOREIGN PATENTS

| | | |
|---|---|---|
| 1,034,699 | France | Apr. 15, 1953 |
| 165,453 | Australia | Oct. 4, 1955 |